E. WENDELER & B. DOHRN.
MOTOR PLOW.
APPLICATION FILED AUG. 19, 1913.

1,182,335.

Patented May 9, 1916.

UNITED STATES PATENT OFFICE.

ERNST WENDELER, OF BERLIN, AND BOGUSLAV DOHRN, OF DOMINIUM WILHELMSHOF, NEAR PRENZLAU, GERMANY.

MOTOR-PLOW.

1,182,335. Specification of Letters Patent. Patented May 9, 1916.

Original application filed March 13, 1912, Serial No. 683,409. Divided and this application filed August 19, 1913. Serial No. 785,453.

*To all whom it may concern:*

Be it known that we, ERNST WENDELER, of Berlin, Germany, and BOGUSLAV DOHRN, of Dominium Wilhelmshof, near Prenzlau, Germany, subjects of the German Emperor, have invented certain new and useful Improvements in Motor-Plows, of which the following is a specification.

This application is a division of the application Serial No. 683,409, filed March 13, 1912.

The invention relates to improvements in motor plows and more particularly to the construction and arrangement of the driving wheels and steering wheels, the nature of which is specified in the following description and claims.

Figure 1:
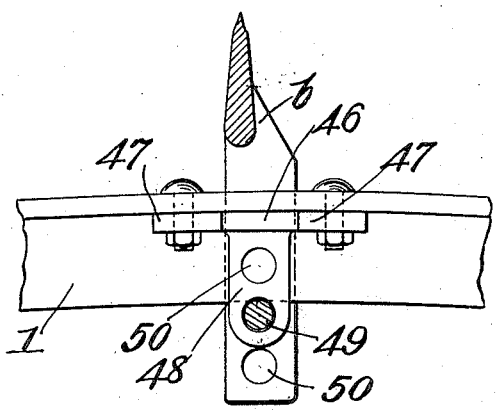
Figure 2:
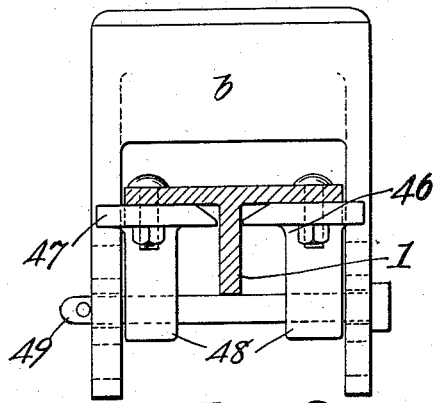

The invention is illustrated by way of example in the accompanying drawing wherein:

Figure 1 is a section in plan of a driving wheel, of a motor plow and Fig. 2 is a section at right angles to the wheel axle.

For the purpose of insuring always a sufficient adhesion of the driving wheels 1 on the ground and of enabling them to adapt themselves to its varying conditions, these wheels are furnished with grippers, which are capable of adjustment as regards their radial projection from rim or tire. Now this invention enables this adjustment to be done in a short time, and thus does away with the usual removal of the grippers and mounting of other grippers which must be carried about specially for this purpose. Figs. 1 and 2 illustrate an arrangement of grippers of this kind. The fork-shaped gripper *b* is set astride the wheel rim 1 which in this example is shown as having a T-shaped cross section. The gripper feeds between guides or brackets 46 which are fitted and bolted on both sides to the flange of the wheel rim 1. Lugs 47 of the guide 46 project laterally and allow between them space for the prongs of the forked gripper. The middle pieces 48 of the guides 46 form bearings for a pin 49 which can be inserted in holes 50 in the prongs of the gripper. The gripper prongs are provided with a number of such holes 50 by means of which the grippers may be set at varying radial heights. For this purpose it is merely necessary after removing the pin 49 (that is kept in place simply by a split pin or the like), to adjust the gripper higher or lower in the wheel rim in the radial direction of the wheel, and then to replace the pin 49. The pin 49 being of smaller diameter than the holes in the prongs of the gripper, during working the loose connection of the grippers with the wheel causes a constant relative movement whereby earth adhering to the wheel is to a certain extent automatically removed.

It is to be understood that the adjustment of the grippers, so that they project more or less radially beyond the wheel rim, may be effected by many other means.

What we claim is:

1. In a driving wheel, grippers having the form of forks mounted astride the rim of the driving wheel and radially projecting therefrom, a plurality of holes provided in each of said grippers, pins capable of being inserted in either of said holes, and means on said rim to support said pins.

2. In a driving wheel, grippers having the form of forks mounted astride the rim of the wheel and radially projecting from said rim, supports on the inside of said rim, holes in the prongs of said forked grippers and in said supports, and pins loosely inserted in said holes.

3. In a driving wheel, radially projecting grippers having the form of forks mounted astride the rim of the wheel and connected to said rim by means allowing an adjustment of said grippers in the radial direction, and pairs of abutments on said wheel rim, the prongs of said grippers fitting in the recesses formed between each pair of abutments.

4. In a driving wheel, grippers projecting radially from said wheel, said grippers having the form of forks mounted astride the rim of the driving wheel, guiding brackets bolted to the flanges of the wheel rim, laterally projecting lugs on said brackets forming a recess between them, the prongs of said fork like grippers fitting in said recesses, radially projecting lugs on said brackets, a hole in each of said radially projecting lugs, a series of holes in said prongs and a pin inserted in said holes.

In testimony whereof we affix our signatures in presence of two witnesses.

ERNST WENDELER.
BOGUSLAV DOHRN.

Witnesses:
HENRY HASPER,
HARRY L. WILSON.